United States Patent [19]

Bishop

[11] Patent Number: 5,129,759

[45] Date of Patent: Jul. 14, 1992

[54] OFFSHORE STORAGE FACILITY AND TERMINAL

[75] Inventor: William M. Bishop, Katy, Tex.

[73] Assignee: PB-KBB, Inc., Houston, Tex.

[21] Appl. No.: 734,576

[22] Filed: Jul. 23, 1991

[51] Int. Cl.[5] ............................................. B65G 15/00
[52] U.S. Cl. ....................................... 405/59; 405/52; 405/210
[58] Field of Search ...................... 405/52, 53, 55, 59, 405/195, 210

[56] References Cited

U.S. PATENT DOCUMENTS

| | | | |
|---|---|---|---|
| 2,590,066 | 3/1952 | Pattinson | 166/21 |
| 2,869,328 | 1/1959 | Gibson et al. | 405/53 |
| 3,003,322 | 10/1961 | Jordan | 405/59 |
| 3,253,414 | 5/1966 | Molique | 405/59 |
| 3,277,654 | 10/1966 | Shiver | 405/55 |
| 3,438,203 | 1/1971 | Lamb et al. | 405/59 |
| 3,438,204 | 4/1969 | Cleary | 405/210 |
| 3,552,128 | 1/1971 | Shook | 405/59 |
| 4,592,677 | 6/1986 | Washer | 405/59 |
| 4,626,131 | 12/1986 | Glew et al. | 405/59 |
| 5,017,043 | 5/1991 | Assaf et al. | 405/52 |

FOREIGN PATENT DOCUMENTS 0157101 10/1985 European Pat. Off. .

OTHER PUBLICATIONS

"Salting Down Crude", The Oil and Gas Journal, Aug. 17, 1953, p. 84.

Oil Gas European Magazine, vol. 11 at pp. 39–45, Nov. 1977.

Salton Sea Solar Pond Project, Prepared by Jet Propulsion Laboratory, California Institute of Technology, Pasadena, Calif. 1981.

Brines and Evaporites by Peter Sonnenfeld, Department of Geology and Geological Engineering University of Windsor, Windsor, Ontario, Canada 1984.

Hot Brines and the Deep Sea Environment by Ludwig Karbe, Institute of Hydrobiology and Fishery Science, Hamburg, University, Federal Republic of Germany.

Primary Examiner—David H. Corbin
Attorney, Agent, or Firm—David A. Rose

[57] ABSTRACT

The offshore facility and terminal includes a plurality of underground salt caverns located beneath the ocean floor. An offshore platform is located above the caverns and includes a flow line to a single point mooring for connection to a supertanker. A well extends from the platform into the underground salt caverns for the flow of hydrocarbons. The hydrocarbons are stored in the underground salt caverns with an immiscible displacing fluid, such as brine. The hydrocarbons and brine are immiscible and have different densities such that the brine settles at the bottom of the underground cavern. Another well extends from the underground cavern to a displacing fluid reservoir. This reservoir is a brine pond located in a depression in the ocean floor. The brine is pumped to and from the brine pond and into the underground cavern to assist in the off-loading and removal of the hydrocarbons.

17 Claims, 2 Drawing Sheets

OFFSHORE STORAGE FACILITY AND TERMINAL

FIELD OF THE INVENTION

This invention relates to offshore storage facilities and terminals for supertankers and more particularly to the storage of hydrocarbons in caverns located beneath the ocean floor as a part of a storage facility and terminal.

BACKGROUND OF THE INVENTION

The storage of hydrocarbons in naturally occurring conventionally mined, or solution-mined subterranean cavities is well known. Generally, the subterranean cavity is entirely filled with hydrocarbons and an immiscible displacing liquid, such as saturated brine. The hydrocarbons and immiscible displacing liquid are housed within the cavity in separate phases. When it is desired to introduce additional hydrocarbons into the cavity, a corresponding volume of brine is simultaneously withdrawn. Conversely, when it is desired to withdraw hydrocarbons from the cavity, it is displaced therefrom with a corresponding volume of brine introduced simultaneously into the cavity. Such on-shore storage systems and methods are generally accepted.

Salt storage caverns have most often been used as the subterranean cavity. A cavern is formed in a salt dome or strata by leaching. It is commonplace to drill into the soluble salt formation and produce brine by solution mining, well known in the art. Dual fluid passages are provided into the cavern so that fluid handling means at the surface provide a capability for brine to be pumped into and out of the lower area of the cavern and hydrocarbons then can be taken from the upper area. Hydrocarbons are added to storage by pumping the hydrocarbons into the cavern under sufficient pressure to displace the brine therein back to the surface. The displaced brine is maintained at ground level in a brine pit or reservoir, and then is returned to the salt cavern to replenish the volume of brine as hydrocarbons are retrieved. Precautions are taken to assure that the brine in and out of the cavern is always salt-saturated to avoid enlarging the brine cavern.

The development of large oil reserves offshore and the off-loading of ultra-large crude carriers or supertankers at offshore terminals have introduced many problems relative to the transportation and storage of the hydrocarbons. Typically, the hydrocarbons being produced or off-loaded are transported to a shore terminal by pipeline or lightering (barge or other small vessel). The pipeline extending from the offshore terminal to shore often is many miles long and must have sufficient capacity to handle the rate of flow of crude oil being off-loaded from the supertanker. Supertankers typically pump up to 100,000 barrels of crude per hour form their holds to an offshore platform where the crude oil enters the pipeline extending to shore. For the pipeline to have sufficient capacity to off-load 100,000 of crude per hour from the supertanker, a plurality of large pipelines sometimes 52 inches in diameter or more may be needed to have sufficient capacity to off-load the supertanker at that flow rate. These large pipelines are expensive and often have a cost in the millions to billions of dollars. Thus, the pipelines to shore account for most of the cost of constructing offshore terminals for supertankers. Obviously, this cost is directly dependent upon the distance of the offshore terminal from shore.

Technical feasibility studies have been made of utilizing an underground storage of crude oil for an offshore terminal. See "Offshore-Terminal with Underground Storage at Sea" by P. C. Relotius, H. Lorenzen, and H. Kaundinya, published in the *Oil Gas European Magazine*, Vol. 11 at pp. 39-45, Nov. 1977. Although in the past subsea tanks have been considered for the storage of hydrocarbons, such tanks tend to collapse under the water pressure and have severe maintenance problems. Subsurface caverns at sea have the problem of how to store the necessary displacement liquid. The present invention overcomes these deficiencies of the prior art.

Natural subsea brine ponds occur in many parts of the world and especially in the Red Sea and the Gulf of Mexico. Such subsea brine ponds have been studied as sources of elements like iodine and bromine and as sources for dissolved natural gas. The present invention either makes use of an existing subsea brine pond or creates a new subsea brine (or other liquid) pond to provide storage for displacement liquid for use in drawing down subsurface hydrocarbon storage caverns.

SUMMARY OF THE INVENTION

The offshore storage facility and terminal of the present invention includes a plurality of underground caverns located beneath the ocean floor. An offshore platform is located above the caverns and includes a hydrocarbon pipeline extending into each of the caverns. A flow line extends from the platform to one or more single point moorings for connection to off-loading or loading supertankers. A displacing fluid pipeline extends between the salt caverns and a subsea reservoir which contains an immiscible displacing fluid such as a brine. A shore pipeline extends from the platform to shore.

As hydrocarbons are off-loaded from the supertanker, a portion of the hydrocarbon stream is directed to the shore pipeline with the remainder being directed to the hydrocarbon pipelines into the underground caverns. As the hydrocarbons flow into the caverns, the immiscible displacing fluid is displaced into the displacing fluid pipeline and the reservoir. Subsequently, as hydrocarbons are removed from the underground caverns, the immiscible displacing fluid is pumped from the reservoir into the underground caverns. Thus, the underground cavern may be used as surge storage for off-loading supertankers or as long-term storage for hydrocarbons from any source.

The combination of a storage facility with an offshore terminal has several significant advantages. The surge capacity afforded by the storage caverns allows the largest of the supertankers to be off-loaded directly into the caverns without requiring a large pipeline to shore having a size to accommodate a flow rate capability equal to that of the supertanker.

Another advantage is that the cavern can afterwards continue to operate as a storage facility with little additional capital costs. Other advantages include a transportation cost lower than lightering; improved environmental safety since lightering is either decreased or eliminated such that the transhipment spill possibilities occur offshore; unlimited, unrestricted, zero cost source of leaching water, i.e. salt water; unlimited, unrestricted, zero cost brine disposal; unlimited space with no hinderance of population; minimal permitting requirements; relatively high facility security; and close to zero land costs.

Other objects and advantages of the present invention will appear from the following description.

DESCRIPTION OF THE DRAWINGS

For a detailed description of a preferred embodiment of the invention, reference will now be made to the accompanying drawings wherein.

DESCRIPTION OF THE PREFERRED EMBODIMENT

Figure 1:
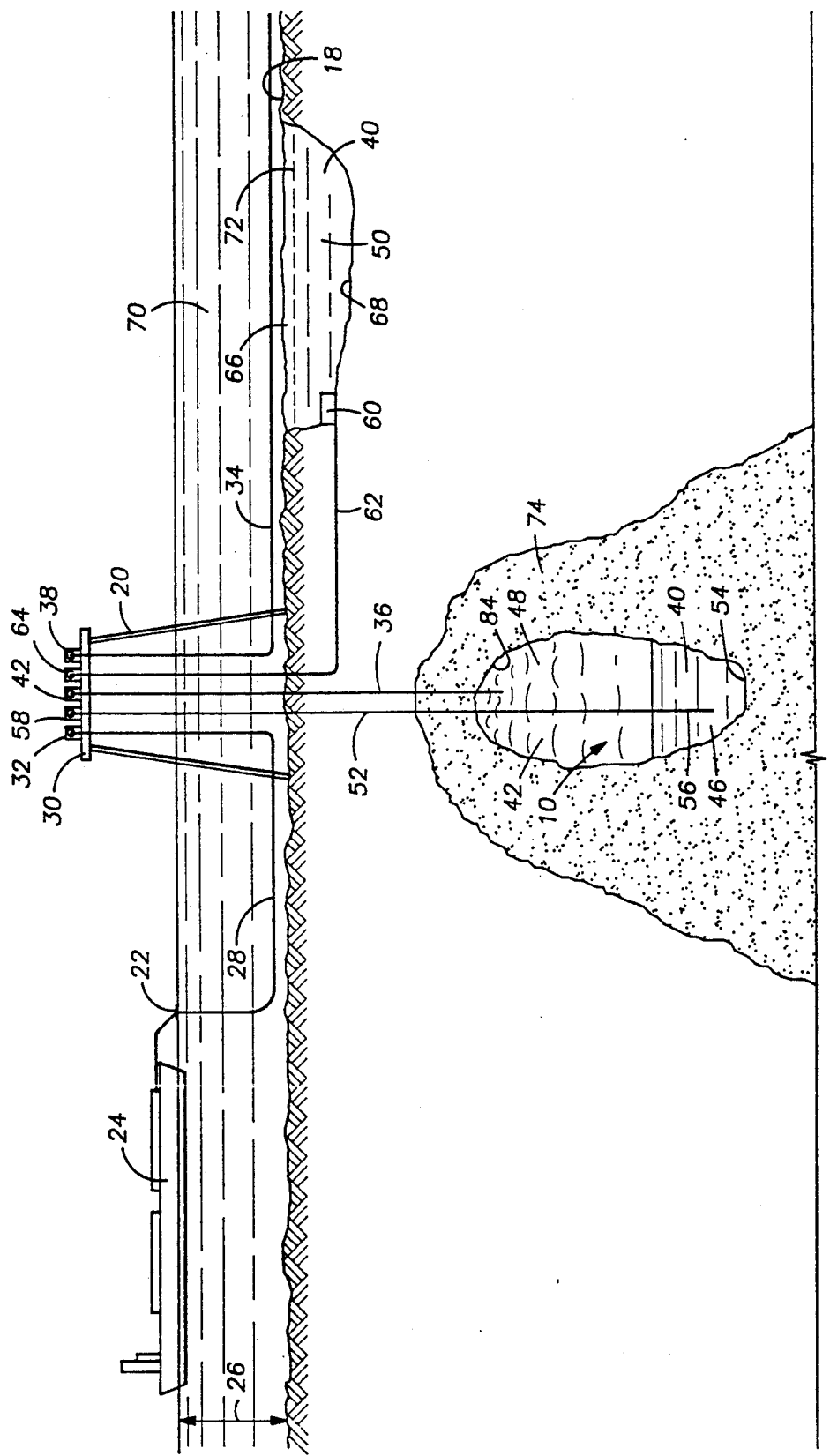
FIG. 1 is a schematic sectional view of the offshore terminal and storage facility utilizing the present invention.
Figure 2:
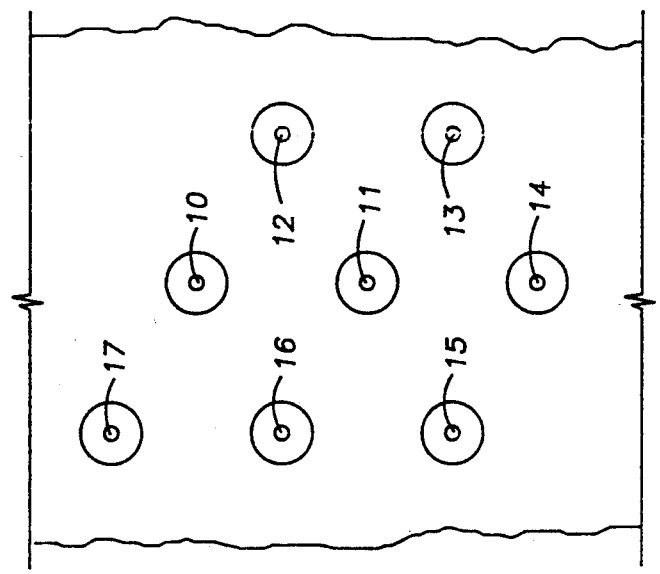
FIG. 2 is a schematic plan view of the underground caverns of the present invention.

Referring initially to FIGS. 1 and 2, the offshore storage facility and terminal of the present invention includes a plurality of underground caverns 10-17 located beneath the ocean floor 18. The number of caverns, and wells in each cavern, must be sufficient to accommodate the tanker off-load flow rate. An offshore platform 20 is installed on ocean floor 18 and located above underground caverns 10-17. A single point mooring 22 is located adjacent offshore platform 20 to accommodate an ultra-large crude carrier or supertanker 24. It is preferred that the offshore storage facility and terminal be located in seas having a depth 26 in the range of 100 to 150 feet, sufficient for the largest expected tankers. Depth 26 must accommodate supertanker 24 and yet allow an offshore platform 20 to be anchored to the ocean floor 18. A flow line 28 extends from the single point mooring 22 to the surface 30 of offshore platform 20. A booster pump 32 may be provided on platform 30 at the outlet of flow line 28. Flow line 28 and booster pump 32 are sized to accommodate a flow rate of up to approximately 100,000 barrels per hour to off-load supertanker 24.

The platform 20 houses all of the pumps including the raw water injection pumps, oil/product injection and booster pumps. The platform 20 also includes the diesel generators, diesel tank, crew headquarters, and helipad. The platform 20 is also connected to a minimum of two bi-directional single point moorings 22. These later provide for off-loading by supertankers and transhipment to lighters. Additional single point moorings could be added as required by the traffic. The diesel tank is removed as cavern storage becomes available.

A shore pipeline 34 extends from the surface 30 of platform 20 to shore. Simultaneously with the off-loading of supertanker 24, hydrocarbons may be continuously pumped to shore through shore pipeline 34. It is contemplated in the present invention that the shore pipeline 34 have a diameter of 36 inches to accommodate a flow rate of approximately 40,000 barrels per hour. A booster pump 38 may be provided at the surface 30 of platform 20 for maintaining the flow rate of hydrocarbons through shore pipeline 34 to shore. It should be understood, of course, that the shore pipeline 34 may be of any size depending upon the average expected flow rate for transporting the hydrocarbons through pipeline 34 to shore.

The surge flow from the off-loading of supertanker 24 is directed to one or more of the underground caverns 10-17 such as through a well flow line 36 which extends from the surface 30 of offshore platform 20 down into underground cavern 10. A booster pump 43 is also provided on the surface 30 of platform 20 for flowing hydrocarbons to and from underground cavern 10 via well 36. The hydrocarbons in underground cavern 10 may be either stored indefinitely or may subsequently be transported to shore via shore pipeline 34 upon the completion of the off-loading of supertanker 24. Alternatively, the hydrocarbons may be transported to shore by lightering.

The design of subsea caverns 10-17 is similar to that of the design used for strategic petroleum reserves. The caverns are approximately 11 million barrels in volume with a net hydrocarbon capacity of 10 million barrels. A typical cavern has an approximate height of 2,000 feet and a diameter of approximately 200 feet. These sizes vary depending upon the uses of the cavern.

An immiscible displacing liquid 40 is placed in underground caverns 10-17 for removing the hydrocarbons 42. The immiscible displacing liquid 40 will not mix with the hydrocarbons 42 such that the hydrocarbons 42 and immiscible displacing liquid 40 separate within underground cavern 10 in separate phases. The immiscible displacing liquid 40 also has a greater density than that of the hydrocarbons 42. The denser immiscible displacing liquid 42 settles to the bottom or lower volume 46 of underground cavern 10 and the hydrocarbons accumulate at the top or upper area 48 of underground cavern 10. This separation into separate phases creates an interface 44 between the two liquids within underground cavern 10. The hydrocarbons 42 and immiscible displacing liquid 40 completely fill the volume or cavity of underground cavern 10 whereby as either the hydrocarbons 42 or immiscible displacing liquid 40 are removed from underground cavern 10, the other fluid is flowed into underground cavern 10 to fill the volume which has been vacated.

Another well 52 for the immiscible displacing liquid 40 extends from the surface 30 of platform 20 down into underground cavern 10 to a point adjacent the bottom 54 of underground cavern 10 so as to ensure that the lower end 56 of well 52 extends into the lower area 46 of underground cavern 10. A booster pump 58 is provided at the surface 30 of offshore platform 20 to assist the flow of the immiscible displacing liquid 40 within well 52. A displacing liquid pipeline 62 extends from the surface 30 of platform 20 to a displacing liquid reservoir 50. Reservoir 50 is preferably located at the ocean floor 18. A submersible transfer pump 60 is provided in reservoir 50 or within the vertical portion of the pipe 62, for the pumping of immiscible displacing liquid 40 from within reservoir 50 through pipeline 62 and well 52 to the lower area 46 of underground cavern 10. A booster pump 64 for the immiscible displacing liquid 40 may also be provided at the surface 30 of offshore platform 20.

The preferred immiscible displacing fluid 40 is brine. Brine is immiscible with hydrocarbons and also is denser than hydrocarbons. The density of crude oil is approximately 0.85 and the density of brine is approximately 1.2. This immiscibility and difference in densities causes the brine 40 to separate from the hydrocarbons 42 and settle into the lower area 46 of underground cavern 10. The hydrocarbons 42 move to the upper area 48 of underground cavern 10 and form interface 44 with the brine 40.

Brine is also the preferred immiscible displacing fluid 40 since the displacing liquid reservoir 50 for the brine may be a depression in the ocean floor 18. Natural depressions or existing brine ponds may be used as the reservoir 50 for brine 40. Alternatively, a depression may be formed in the ocean floor 18 by means such as hydraulic dredging. The reservoir or brine pond 50 is preferably at least 10 feet deep. A freeboard 66 above the brine level is preferred to allow a sufficient buffer zone between the brine 40 and seawater 70. Also, a greater depth is preferred to minimize the surface area of pond 50 and therefore the interface 72 with the seawater 70 so as to reduce the loss of brine 40 into the seawater 70 due to mechanical mixing or diffusion. The brine 40 is denser than the seawater 70. The density of seawater is approximately 1.03 and the density of brine is approximately 1.2. Thus, the brine settles to the bottom 68 of brine pond 50 with the seawater 70 remaining above the brine 40 thereby forming interface 72. The difference in densities between the brine 40 and seawater 70 keeps the interface 72 stratified. Also the difference in surface tension between seawater and brine minimize mechanical mixing.

Surface brine ponds are in use in Israel to recover solar energy. These solar ponds consist of a surface layer of near-fresh water underlaid by saturated brine. Sun passes through the surface water and heats the brine to approximately 200 degrees F. The brine remains stratified, however, due to its higher density. The large difference in surface tension between the two liquids also enhances stratification. Research has shown that the interface between brine and less saturated layers is remarkably stable.

The submersible transfer pump 60 is sealed and submerged adjacent the bottom 68 of brine pond 50. Pump 60 is located near bottom 68 to avoid the area of mixing between the seawater 70 and the brine 40. However, the intake of the pump 60 is located above the bottom 68 to avoid pumping sediment into pipeline 62. The velocity of pump 60 is kept to a minimum to avoid stirring up the bottom. Pump 60 is typically supported on a foundation (not shown) on the brine pond floor 68. The pump 60 is well sealed and normally electrically driven from the surface 30 of platform 20. As an alternative, the pump 60 may be a vertical shaft pump housed in the vertical portion of pipeline 62 extending to platform 20. This avoids placing the pump 60 at the bottom 68 of brine pond 50.

It is critical that oil leaks be prevented to the sea floor brine pond 50. This can occur slowly by leaking of oil through the couplings into the brine pipeline 62 or by the failure of the brine pipeline 62 exposing the brine side completely to oil. Sensors (not shown) are installed to detect both the slow leak and the catastrophic leak, activating ESD valves to immediately shut in the problem cavern. Booms and recovery systems are available on the platform 20. An in-line separation tank may also be feasible.

It is preferred that the underground caverns 10-17 be subsea salt caverns. Salt caverns are formed by "leaching" an underground salt dome, such as salt dome 74, whereby water is pumped down into the salt dome 74 to form brine. Thus, the use of salt caverns as underground caverns 10-17 has the additional advantage that a immiscible displacing liquid 40, such as the preferred brine, is produced during the formation of the salt cavern.

In constructing the offshore storage facility and terminal of the present invention, the initial well to be drilled, for example well 36, is a combined exploratory and production well which is drilled from a jackup rig (not shown). Core and logs from this well will confirm seismic data and establish the suitability of the salt dome 74 for storage purposes. Once the suitability of the salt dome 74 has been established, the first well 36 is completed in the leaching configuration and capped at sea bottom 18.

The permanent offshore platform 20 is then built and centered over cavern 10. The remaining wells for the other seven caverns 11-17 are drilled from the offshore platform 20 using directional drilling where required. All well heads are brought to the surface 30 of platform 20 and all well functions are performed from that point. The platform drilling rig is moved to the next platform and is replaced by a permanent work-over rig.

Caverns 10-17 are leached using the "leach-fill" mode which allows filling the caverns with hydrocarbons 42 as the caverns are being leached. This allows for the earliest possible cavern use by developing the top of the cavern first. This approach is slightly more costly than the "leach-then-fill" method which requires that the caverns 10-17 be completed before filling them with hydrocarbons 42. In the latter approach, leaching can be interrupted for the temporary filling of the cavern with hydrocarbons if necessary. The choice of leaching method depends on project schedule. However, the "leach-fill" method would allow the earliest use of the caverns 10-17 and terminal facilities.

Figure 4:
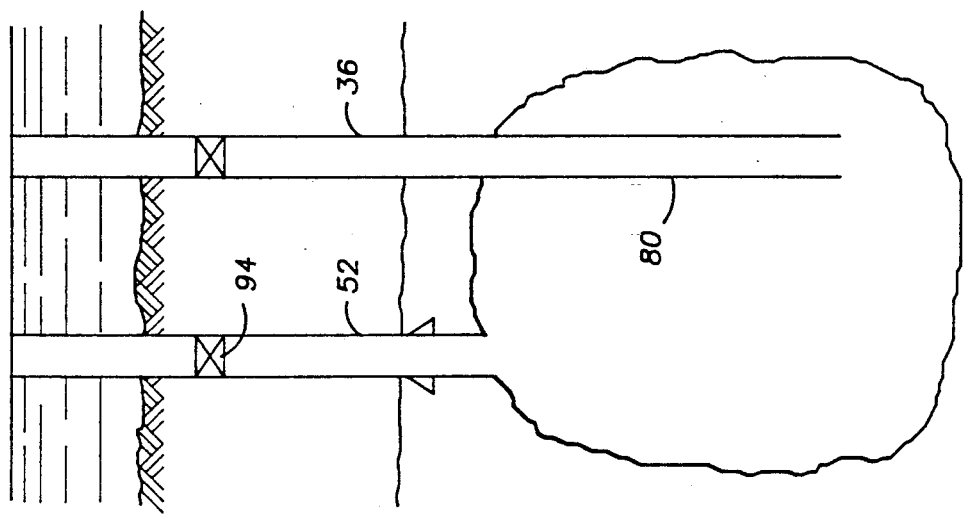
FIG. 4 is a schematic sectional view of the final configuration of the underground cavern.
Figure 3:
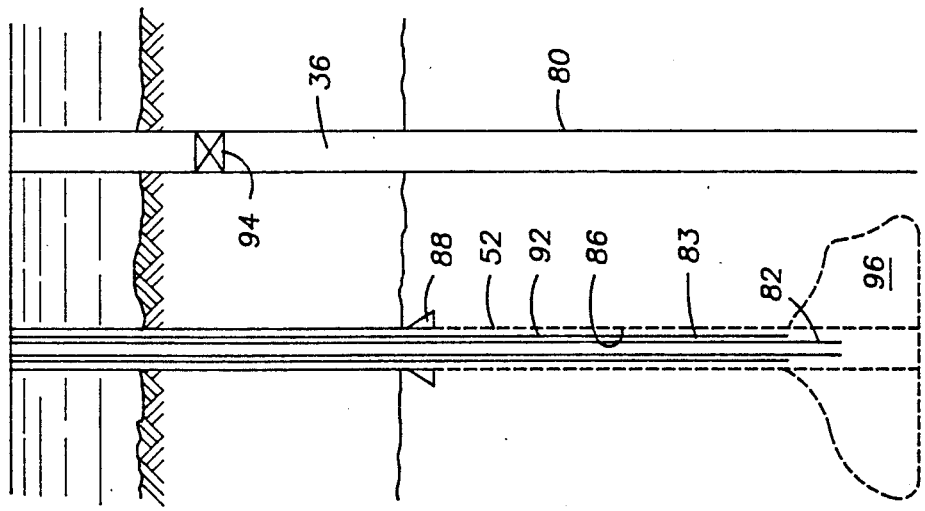
FIG. 3 is a schematic sectional view of the initial leaching configuration of the underground cavern.

Referring now to FIGS. 1, 3 and 4, subsea salt surge cavern 10 is formed by leaching salt in subsea salt dome 74. Hydrocarbon well 52 and brine well 36 are drilled from the offshore platform 20 into the salt dome 74. Brine well 36 includes a string of casing 80 which extends from offshore platform 20 to a location 46 adjacent the bottom 54 of cavern 10. The hydrocarbon well 52 includes two strings of tubing 82, 83 which extend from the platform 20 to a location 84 adjacent the top of salt cavern 10. Well 52 includes an outer casing 86 through which extend tubing 82, 83. The outer casing 86 is cemented at 88. A subsurface safety valve 94 may also be installed for both wells 36, 52. The wells 36, 52 normally use a last cemented casing which is typically a 13⅜" diameter casing.

In the leaching configuration, the casing 80 of the brine well 36 is cemented to just above the total cavern depth. The hydrocarbon well 52 is cemented to 100 feet above the cavern roof 84. The actual depth of the cavern roof depends on the geometry of the selected salt dome, but a desirable position would be between 1,500 and 3,000 feet below the sea floor 18. The spacing between adjacent caverns 10-17 would provide a pillar to diameter ratio of 1.78. The two hanging tubing strings 82, 83 are set in well 52 and initial brining takes place so as to produce a sump at 96 connecting with the brine well 36. At the time of the connection, one of the strings 82 is removed from the well 52 and subsequent leaching takes place by injecting seawater in one well and producing brine from the other well, the brine being formed by the salt dissolving into the water.

The leaching rate is chosen preliminary at 1.2 million barrels per day. This is as high as a typical strategic petroleum reserve site but in the present case, because of the lack of raw water and brine disposal constraints, flow rate cost is a function of pumps, power and piping only. Since most of the power piping and pumps are needed later in any event, the high rate represents only a marginal increase in costs. At 1.2 million barrels per day, 12 seawater pumps at 100,000 barrels per day are required. These can be converted to oil booster pumps upon completion of the leaching. After completion of the caverns, brine for injection at approximately 40,000 barrels per hour is obtained from the sea floor brine pond 50 using transfer pumps 60.

The brine that is produced in the formation of a salt cavern is approximately eight times the volume of the cavern being produced. Thus, there is sufficient brine produced to fill a brine pond 50 with seven times the displacement requirements of the hydrocarbons within the underground cavern. For example, if 100 million barrels of long term storage is produced, an excess of more than 700 million barrels of brine is produced for the brine pond 50.

For the first eight subsea caverns 10-17, the final configuration of each cavern consists of two wells, a hydrocarbon fill well 52 and a brine well 36 to allow a total fill rate of approximately 100,000 barrels per hour. To achieve this rate, the hydrocarbon fill well 52 and brine well 36 utilizes a last cemented casing of 13⅜". This size well allows a draw down rate of approximately 100,000 barrels per hour over eight caverns with a velocity of approximately 24 feet per second. This velocity is within the requirements of strategic petroleum reserves.

After the first seven caverns 10-16 have been completed, several alternatives are available depending upon schedule and economic and technical conditions. A third well may be drilled into two of the existing caverns to provide additional flow capabilities. A small satellite platform may be established to service the eighth cavern. Another permanent platform may be established to service a second set of seven caverns. The latter is the most economical assuming that additional storage will be needed. The second platform would be constructed immediately following the first platform.

Referring again to FIG. 2, there is shown a preferred cavern arrangement. Eight caverns having 2 wells each are designed to accommodate the flow rates of the supertanker 24. Subsequent caverns would require only one well each, since surge flow requirements are already met. Expansion of the cavern layout may take place in any direction.

For an initial period, the offshore facility of the present invention may be operated without a pipeline extending to shore. The facility would be used strictly for storage and transhipment, or conversely, if the need for the offshore port is immediate, the pipeline and a sufficient number of subsea caverns for surge storage would be constructed first. Long-term storage caverns would be constructed later, depending upon the demand.

After the initial eight caverns are completed to accommodate the surge flow from the supertanker 24, the remaining caverns are leased and operated using only one well per cavern. Two wells may still be desirable, however, depending upon the draw down rate and inspection requirements. For example, the slick oil hole allows complete cavern oil sampling.

In operation, the supertanker 24 is moored adjacent offshore platform 20 and is connected to flow line 28 which communicates with a plurality of booster pumps, such as pump 32, located on platform 20. To off-load the supertanker 24 on a timely basis, approximately 100,000 barrels of crude oil are pumped per hour from the supertanker 24 and simultaneously into the eight subsurface salt caverns 10-17. However, hydrocarbons may or may not be pumped from all eight caverns 10-17 for transportation to shore via pipeline 34. The crude oil 42 is pumped down the well 52. As the volume of crude oil 42 builds within the upper portion 48 of salt cavern 10, a hydrostatic head is formed placing pressure on the brine 40 located in the lower portion 40 of salt cavern 10. This pressure causes the brine 40 to be forced up through well 36. This outflowing brine 40 is flowed through pipeline 62 and into brine pond 50. The crude oil stream through flowline 28 from the supertanker 24 may also be split with a portion being fed into an offshore pipeline 34 which is transported to shore. The brine 40 being forced out of salt cavern 10 then accumulates in brine pond 50. Pipeline 34 extending to shore is preferably a 36" pipeline which would take the place of the prior art requiring two or more much larger pipelines.

Since the pipeline 34 to shore will only handle 42,000 barrels per hour, the additional 58,000 barrels being pumped from the supertanker 24 flows into the plurality of salt caverns 10-17 such as cavern 10. Thus, the salt caverns 10-17 take the additional surge of crude oil 42 flowing from the supertanker 24. Upon the completion of the unloading of the supertanker 24, the pump 60 may pump brine 40 back into salt cavern 10 by means of pipeline 62 and well 36. As the additional brine 40 accumulates in the bottom 54 of salt cavern 10, the interface 44 between the brine 40 and crude oil 42 moves upwardly as the oil is forced back up well 52 to offshore platform 20. There the crude oil is flowed into pipeline 34 to the shore. It is necessary that the brine pond 50 have a sufficient volume of brine to completely fill salt cavern 10 so as to allow the emptying of salt cavern 10 of crude oil.

When it is desired to displace the hydrocarbons 42 from the caverns, brine 40 is pumped from the brine pond 50 into the caverns, moving the hydrocarbons 42 to booster pumps located on the platform 20. The hydrocarbons 42 are then moved to lighters at the single point moorings 22 or to the pipeline 34 extending to shore.

It is necessary that the brine pond have a volume of brine in excess of the volume of salt cavern 10 to ensure that there is sufficient brine to empty salt cavern 10 of crude oil. If seawater were to be used for pumping into salt cavern 10, additional leaching would occur so as to unduly enlarge the cavern within salt dome 12. Ultimately the dome would be used up. As previously described, eight barrels of brine are produced in making one barrel of volume in salt cavern 10. Thus, upon completion of the cavern 10, the brine pond 50 will have at least eight times the volume of salt cavern 10.

No environmental problems are anticipated with the use of the subsurface brine pond 50, since the ocean has natural brine ponds. These brine ponds occur because of the higher density of brine that settle to the bottom in local depressions on the ocean floor where the brine stratifies beneath the seawater. The source of the brine can be from subsurface salt deposits or the treating of seawater thus producing brine.

Although some loss of brine will occur from the brine pond 50 due to the seawater, such losses are negligible in view of the fact that the brine pond 50 holds several times the amount of brine required for operating the subsurface storage salt cavern 10. Although the surface tension is different between the brine and salt water, some molecular diffusion still occurs. However, calculations have shown that only on the order of eighty gallons of brine are lost per day by diffusion in a brine pond which holds 10,000,000 barrels of brine. If the brine pond 50 is too shallow, the large surface area will increase the loss rate of brine. Thus, as the surface area of the brine pond 50 increases, vis-a-vis the volume, a greater loss will occur. This is negligible when compared to the excess barrels of brine.

Some brine may be lost due to ocean currents along the bottom of the ocean floor 18. Since the velocity of the current is zero at the ocean floor, the velocity directly above the pond is small. Most currents are minimal at the ocean floor and are not seen to cause any substantial loss of brine. Wave action is limited to the depth of one-third of the wave amplitude. Thus, wave action is not a factor. Prop wash from the supertankers might be a problem so that the pond is located away from the supertanker routes to the platform. Further, research indicates that mixing with the seawater is negligible.

Although it is possible that brine may seep into the ocean floor, in general, the ocean floor is very compact and almost impermeable to the seepage of brine. Thus, practically no loss is seen through the ocean floor 18. If such seepage were a problem in a given geographic area, the brine pond 50 could be lined.

The salt caverns 10 have a variety of uses. They may be used for the offshore terminal or port. Salt cavern 10 may serve as a storage facility as well as a pump facility and be used to store strategic reserves. Further, cavern 10 may also be used to permanently store hydrocarbons such as OPEC crude oil which is then held in storage as collateral for loans. Cavern 10 may also serve as a lightering facility where larger vessels may unload crude oil which is then loaded onto smaller vessels that service ports not having a pipeline to shore.

The brine pond 50 is seen to have a life of up to fifty years. If additional brine were required, a new well could be drilled into the salt dome and expanded to produce additional brine. Should additional brine be required, various alternatives are possible. Continuous leaching of additional storage caverns will provide a continuous supply of brine. Caverns at a reasonable cost could also be developed for brine production. It is considered that a need for such a backup for a source of brine is remote.

It should be appreciated that although the above discussion has been in terms of crude oil, as an example, virtually any type of hydrocarbon, with the possible exception of residuum, could be stored in separate caverns. For example, the salt cavern 10 may be used to store fuel oil, gasoline, and diesel fuel. The storage facility could also be used as a surge collection point for natural gas, before batching the gas to shore. The hydrocarbons can then lightered or batched through the pipeline. Batching is common in onshore operations.

While a preferred embodiment of the invention has been shown and described, modifications thereof can be made by one skilled in the art without departing from the spirit of the invention.

I claim:

1. A brine pond in a subsea floor for displacing of hydrocarbons in an underground storage salt cavern, comprising:
   a depression in the subsea floor;
   a pipeline communicating between said depression and the underground storage salt cavern;
   brine accumulated in said depression; and
   means for flowing brine to and from the underground storage salt cavern.

2. The brine pond of claim 1 wherein said depression is a hydraulic dredging of the subsea floor.

3. The brine pond of claim 1 wherein said means includes a pump connected to said pipeline for the pumping of said brine.

4. The brine pond of claim 1 wherein said means includes a pump housed within said pipeline for pumping said brine.

5. The brine pond of claim 1 wherein said means includes a submersible pump located adjacent a bottom of said depression, said pump having an intake located within said brine above said bottom to avoid pumping sediment into said pipeline.

6. The brine pond of claim 1 wherein said depression is lined with a liner to avoid the loss of brine into the subsea floor.

7. The brine pond of claim 1 wherein said depression houses a volume of brine up to approximately 8 times the volume of the cavern.

8. An offshore storage facility for hydrocarbons comprising:
   an underground cavern located beneath the ocean floor;
   first means for flowing the hydrocarbons to and from said cavern;
   an immiscible displacing fluid having a density greater than that of the hydrocarbons;
   an underwater reservoir for storing said immiscible displacing fluid; and
   second means for flowing said immiscible displacing fluid between said cavern and said reservoir.

9. The offshore facility of claim 8 further including an offshore platform for housing said first means.

10. The offshore facility of claim 8 wherein said first means further includes a first pump and a first pipeline extending from within said underground cavern to said first pump.

11. The offshore facility of claim 10 further including a flow line extending from said platform to a single point mooring.

12. The offshore storage facility of claim 8 wherein said second means includes a second pump for pumping said immiscible displacing fluid between said cavern and said reservoir.

13. The offshore facility of claim 12 wherein said second means further includes a second pipeline extending from said cavern to said reservoir.

14. The offshore facility of claim 8 wherein said immiscible displacing fluid is brine.

15. The offshore facility of claim 8 wherein said underground cavern is located in a salt dome beneath the ocean floor.

16. The offshore facility of claim 8 further including a pipeline extending from said platform to the shore.

17. A method of unloading offshore tanker carrying crude oil, the method comprising the steps of:
   anchoring the tanker at a single point mooring;
   connecting a first flow line from the tanker to a second flow line at the single point mooring with the second flow line extending to an offshore platform;
   directing a portion of the hydrocarbon stream being unloaded from the tanker into a pipeline extending to shore;

directing the remainder of the hydrocarbon stream being unloaded from the tanker into a second pipeline extending into an underground cavern;

the inflow of the hydrocarbons into the underground cavern displacing an immiscible displacing fluid within the cavern into a third pipeline extending from the underground cavern to an underwater reservoir;

accumulating the immiscible displacing fluid in the underground reservoir;

subsequent to the unloading of the tanker, pumping immiscible displacing fluid from the underwater reservoir into the underground cavern;

displacing the hydrocarbons in the underground cavern into the second pipeline; and flowing the displaced hydrocarbons from the underground cavern into the pipeline extending to shore.

* * * * *